Figure 1:
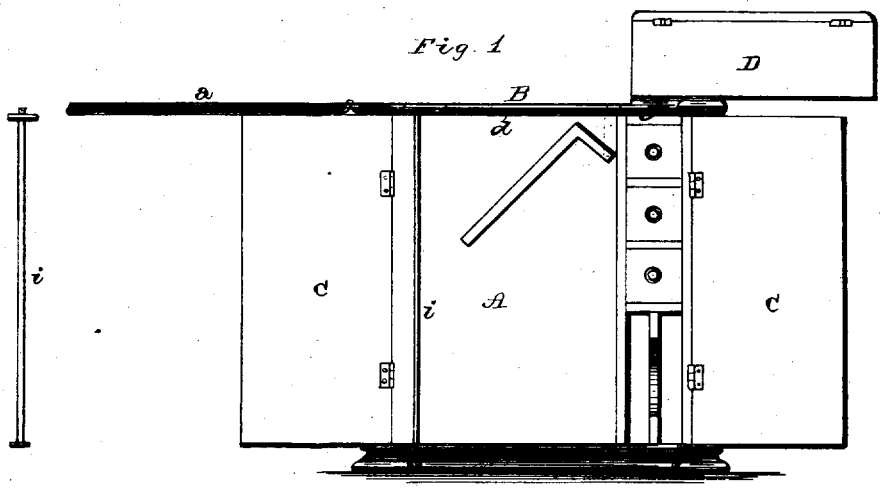
Figure 2:
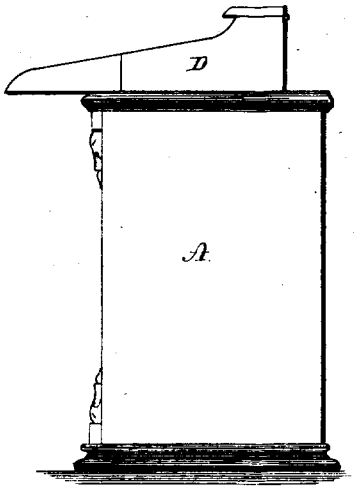
Figure 3:
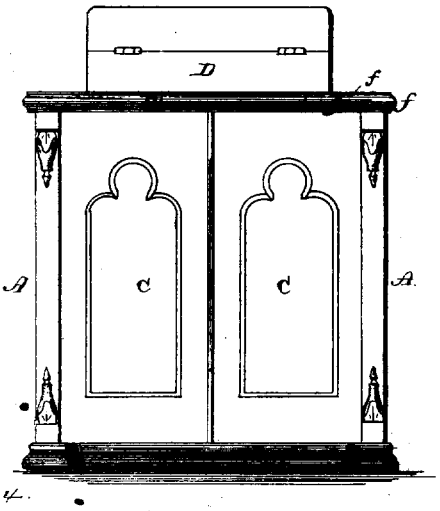
Figure 4:
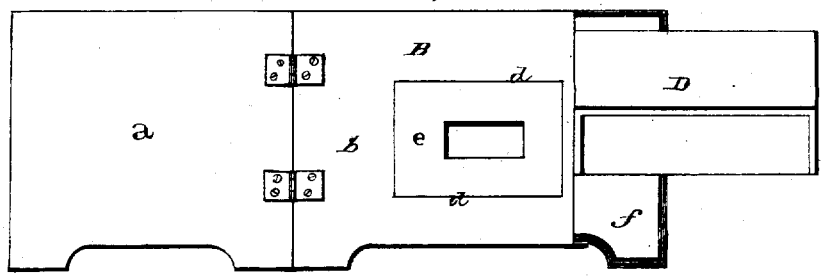

F. R. WOLFINGER.

Sewing-Machine Table.

No. 6,430. Reissued May 11, 1875.

WITNESSES.

Wm Turner

Chas W Lemon

INVENTOR.

F. R. Wolfinger per

F. A. Lehmann, Atty

THE GRAPHIC CO. PHOTO-LITH. 39 & 41 PARK PLACE, N.Y.

UNITED STATES PATENT OFFICE.

FRANCIS R. WOLFINGER, OF CHICAGO, ILLINOIS.

IMPROVEMENT IN SEWING-MACHINE TABLES.

Specification forming part of Letters Patent No. 117,359, dated July 25, 1871; reissue No. 6,430, dated May 11, 1875; application filed March 11, 1875.

*To all whom it may concern:*

Be it known that I, FRANCIS R. WOLFINGER, of Chicago, in the county of Cook and State of Illinois, have invented certain new and useful Improvements in Sewing-Machine Tables; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an improvement in sewing-machine tables; and it consists in making a suitable opening through the top of the table, and hinging in this opening the bed-plate to which the machine is secured, so that the machine can be swung downward below the level of the table when not wanted, and raised up into position again for use. It also consists in pivoting to the top of the table a writing-desk, which can be swung around to one side when the machine is raised above the top of the table, and then swung around over the center of the table when the machine is dropped down under it, as will be more fully described hereafter.

The accompanying drawings represent my invention.

A represents the cabinet, and B the top of the table. The top consists of two parts, *b* and *a*, the latter being hinged to the edge of the former, and is unfolded when the machine is to be used, and when unfolded is supported by one of the doors C. In the part *b* is an opening, *d*, for the machine, when lowered, to pass through, which opening, when the machine is used, is closed by the bed-plate *e*. This bed-plate, upon which the machine is secured, is hinged within the edge of the opening *d*, so that when the machine is not wanted it can be swung down below the top of the table into the cabinet.

By thus hinging the bed-plate to the table the machine can be dropped down into the cabinet when not wanted, and thus be entirely removed from sight, and allow the cabinet to be used as a writing-table, as here shown, or, when the desk is removed, as an ordinary table.

The leaf *a*, when folded over the part *b*, to which it is hinged, extends to the raised part *f* of the top, with which it then forms an even surface. Upon the part *f* is pivoted a writing-desk, D, which, when the machine is to be used, is turned sidewise, so as not to interfere with the operator. The writing-desk consists of two parts hinged together, so that when the upper part is laid back or opened it extends beyond the front of the cabinet. The cabinet is held together by rods *i*, provided with screws, so that it can be readily taken apart when required for the purpose of packing for shipping, and as easily put again together.

I am aware that it is not new to make a hole or opening in the top of the table, so that the machine can be lowered into the cabinet by means of levers and cords, and this I disclaim. My invention consits in hinging or pivoting the bed-plate to the table, so that the bed-plate will be dropped downward at one end only.

Having thus described my invention, I claim—

1. A cabinet or table for sewing-machines, provided with a bed-plate for the machine, that is hinged at one end to the cabinet, substantially as described.

2. A cabinet or table for sewing-machines, having an opening through its top, a bed-plate for the machine, that is hinged at one end inside of the opening, and a cover to close over the said opening when the bed-plate is dropped down below the level of the table, substantially as shown.

3. The combination of a cabinet or table for sewing-machines with a writing-desk that is pivoted thereto at or near one end, so that the desk can be swung around out of the way while the machine is being used, substantially as set forth.

In testimony that I claim the foregoing I have hereunto set my hand.

FRANCIS R. WOLFINGER.

Witnesses:

D. HARRY HAMMER,

H. F. SCHOFF.